United States Patent [19]
Tanaka et al.

[11] Patent Number: 5,834,528
[45] Date of Patent: Nov. 10, 1998

[54] POLYTETRAFLUOROETHYLENE POROUS COMPOSITE FILM

[75] Inventors: Osamu Tanaka; Katsutoshi Yamamoto; Osamu Inoue; Toshio Kusumi; Shinichi Chaen; Jun Asano; Nobuki Uraoka, all of Osaka, Japan

[73] Assignee: Daikin Industries Ltd., Osaka, Japan

[21] Appl. No.: 578,710

[22] PCT Filed: Apr. 26, 1995

[86] PCT No.: PCT/JP95/00821

§ 371 Date: Feb. 21, 1996

§ 102(e) Date: Feb. 21, 1996

[87] PCT Pub. No.: WO95/29950

PCT Pub. Date: Nov. 9, 1995

[30] Foreign Application Priority Data

Apr. 28, 1994 [JP] Japan ................................... 6-091434

[51] Int. Cl.$^6$ .................................................. C08F 14/02
[52] U.S. Cl. ..................... 521/145; 264/45.1; 264/235.8; 264/288.4; 264/290.2; 428/315.5; 428/422
[58] Field of Search ............................. 521/145; 264/451, 264/435.8, 288.4, 280.2; 428/315.2, 422

[56] References Cited

U.S. PATENT DOCUMENTS

| | | |
|---|---|---|
| 3,962,153 | 6/1976 | Gore . |
| 4,547,424 | 10/1985 | Suzuki . |
| 4,713,070 | 12/1987 | Mano . |
| 5,064,593 | 11/1991 | Tamaru et al. .......................... 264/113 |
| 5,225,131 | 7/1993 | Tamaru et al. .......................... 264/113 |

FOREIGN PATENT DOCUMENTS

| | | |
|---|---|---|
| 0 051957 | 5/1982 | European Pat. Off. . |
| 410364 | 4/1972 | Japan . |
| 5-453365 | 4/1977 | Japan . |
| 53-30669 | 3/1978 | Japan . |
| 53-85865 | 7/1978 | Japan . |
| 5617216 | 4/1981 | Japan . |
| 57-51450 | 3/1982 | Japan . |
| 5-825368 | 5/1983 | Japan . |
| 2-284614 | 11/1990 | Japan . |
| 5-202217 | 8/1993 | Japan . |
| 5-214140 | 8/1993 | Japan . |
| 5-295147 | 11/1993 | Japan . |
| WO94/19170 | 9/1994 | WIPO . |

OTHER PUBLICATIONS

Preprint of The 11th Symposium of Air Cleaning and Contamination Control, Apr. 21–22, 1992, pp. 153–156.

"Cleanroom Handbook" edited by Japanese Air Cleaning Association, published by Ohm Publishing Co. on Jan. 10, 1990.

*Primary Examiner*—John M. Cooney, Jr.

[57] ABSTRACT

An object is to provide a polytetrafluoroethylene (PTFE) porous composite film which has substantially no defect portion.

There is provided the PTFE porous composite film by stretching a composite along its width direction which composite is composed of at least two overlapped films longitudinally stretched at a temperature not higher than a melting point of a sintered PTFE material, each film being obtained by paste-extruding and semi-sintering thereafter a PTFE produced by emulsion polymerization.

34 Claims, 4 Drawing Sheets

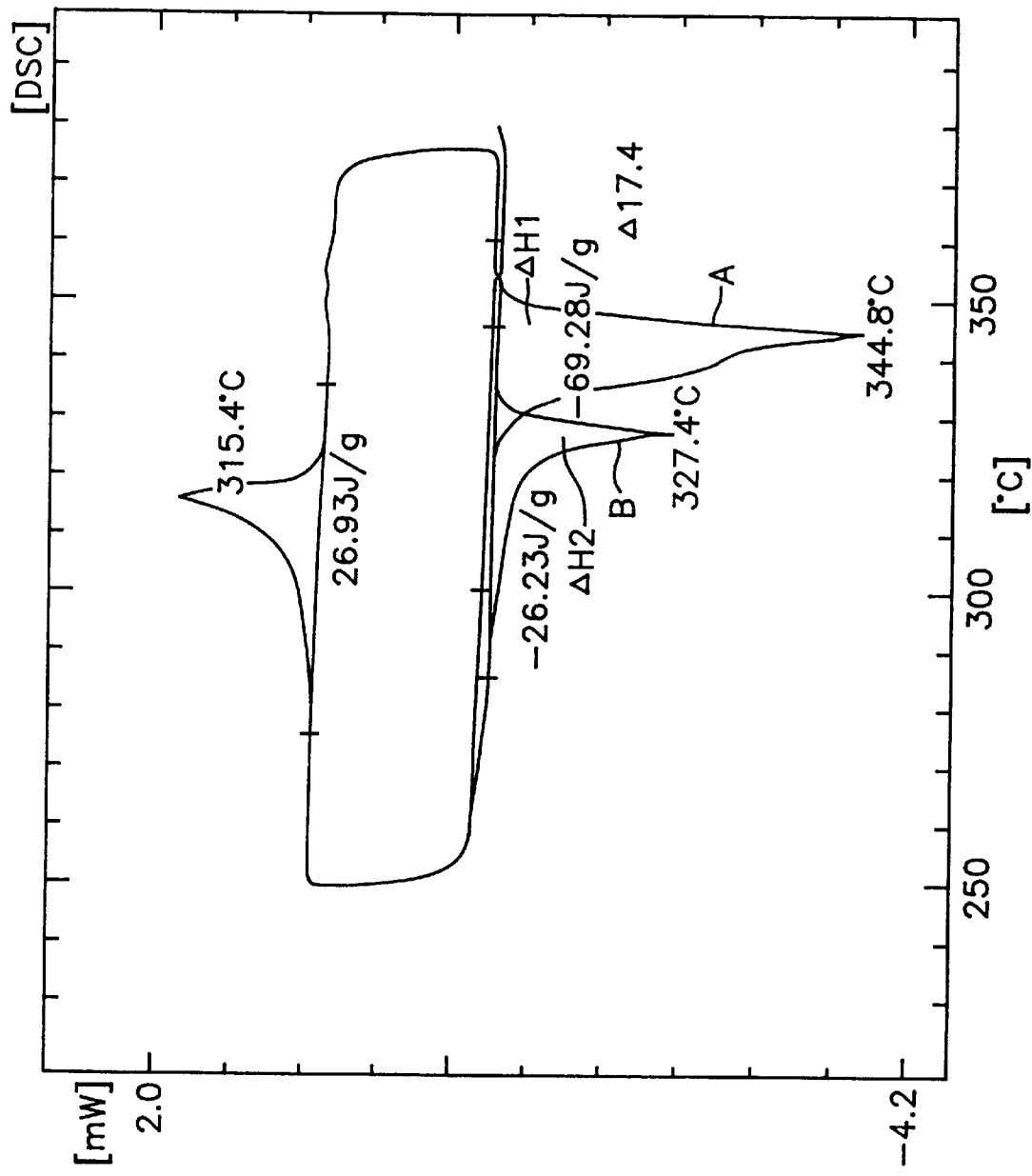

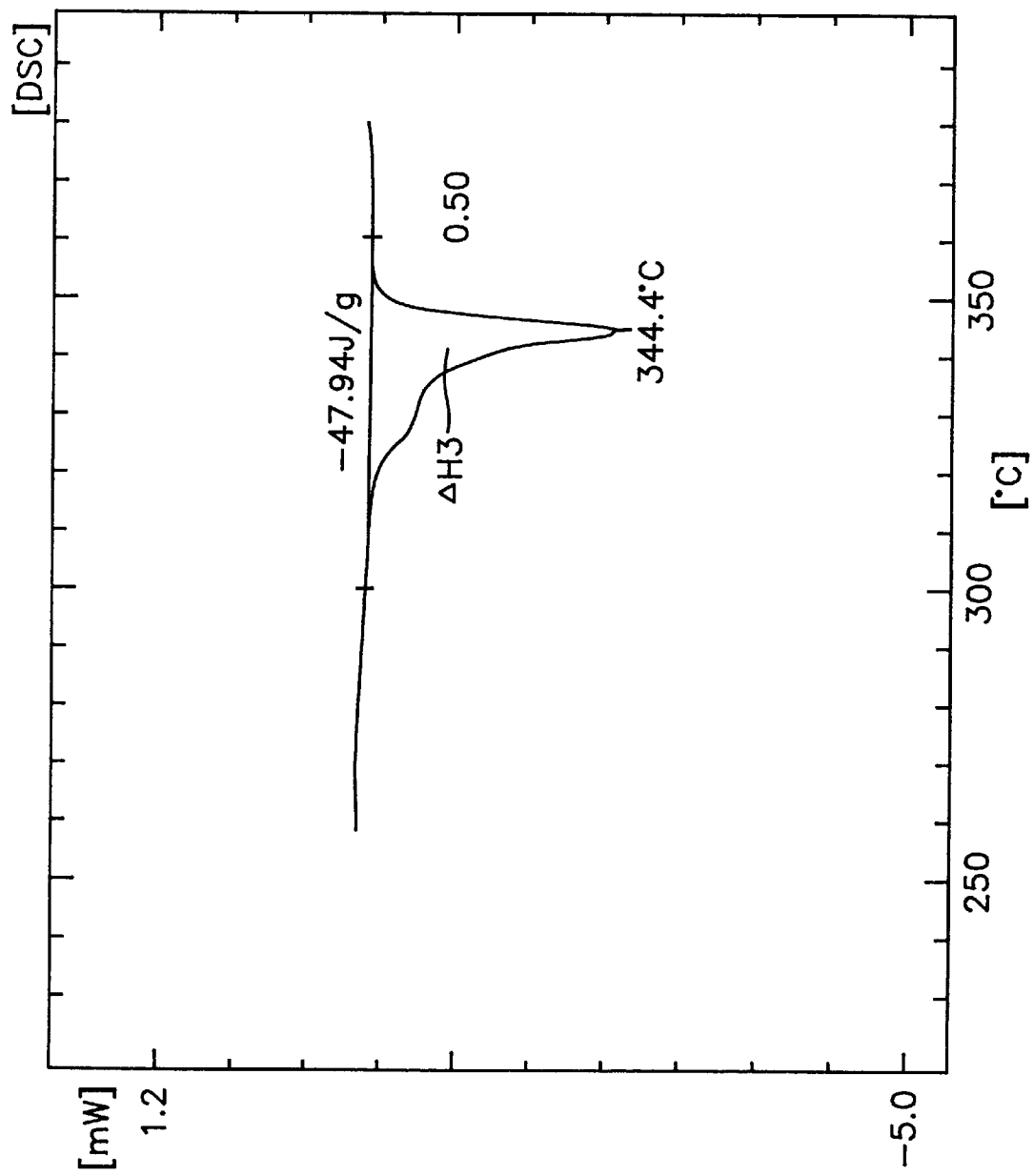

POLYTETRAFLUOROETHYLENE POROUS COMPOSITE FILM

[TECHNICAL FIELD]

The present invention relates to a production process of a polytetrafluoroethylene (hereinafter, referred to as also "PTFE") porous composite film (or membrane) and a PTFE porous composite film produced by such process. Further, the present invention relates to a filter, in particular a high performance air filter for the removal of fine particles in a fluid (for example air) in which the PTFE porous composite film is used.

The porous film according to the present invention can be used as a filter medium for an air filter, in particular a filter medium for an ULPA (ultra low penetration air) or HEPA (high efficiency particulate air) filter which cleans an inside atmosphere of a cleanroom of semiconductor industries or a production equipment for precise electronic devices, chemical agents or biochemical products, or as a filter medium for a liquid filter.

[BACKGROUND ART]

Recently, completely cleaned air or highly cleaned liquid agents have been required in production processes of semiconductor industries, precision industries, biotechnology industries and so on. Particularly, a highly cleaned atmosphere inside the production equipments achieved by, for example by the removal of fine particles has been demanded with the recent highly integration in the semiconductor industries. With respect to the cleaned air, it has been obtained by recirculating and filtering air through an air filter. Also, with respect to the liquid agents used particularly in the semiconductor industries, highly cleaning thereof has been required and it is achieved by recirculating and filtering the agents through a filter.

Various filters have been hitherto proposed and practically used for the above purposes. Particularly, with respect to the air filter, a filter medium which is now popularly used is produced by paper-making with addition of a binder to glass fibers. However, such a filter medium has some defects. For example, dusts are formed due to the presence of micro-fibers depositing on the filter medium, dust self-formation when the medium is processed or folded, or binder and glass degradation when the medium contacts with certain agents such as hydrofluoric acid.

In order to solve the above problems, the use of an electret filter medium made of a synthesized fiber is proposed (Japanese Patent Kokai Publication No. 53365/79), but it is stated that its static electric force is shielded by fine particles collected on the medium so that its effect disappears and collection performance is reduced (see preprint of "The 11th Symposium of Air Cleaning and Contamination Control" (Apr. 21 to 22, 1992), pp. 153–156). Accordingly, it is proposed to use a stretched polytetrafluoroethylene porous film so as to provide means to overcome those disadvantages and to form a cleaned atmosphere (Japanese Patent Kokoku Publication No. 10364/1992 and Japanese Patent Kokai Publication No. 284614/1990).

In the above proposals, a stretched PTFE film is used which has a pore diameter not less than 1 $\mu$m so as to prevent increase of a pressure loss. A theory in which fine particles having a diameter less than the pore diameter of the film can be trapped is as follows:

Particles contained in a fluid are said to be removed according to the following main mechanisms ("Cleanroom Handbook" edited by Japanese Air Cleaning Association published by Ohm Publishing Co. on Jan. 10, 1990):

1) Direct Stoppage: A mechanism in which relatively large particles are stopped and removed by micro-fibers as if they were sieve-separated;
2) Inertia Collision: A mechanism in which when particles go through a tortuous passage between micro-fibers, they cannot change their going directions so rapidly as a gas does so that they collide with and deposit on the micro-fibers;
3) Diffusion/Brown Movement: A mechanism in which very fine particles spirally move in a gas under controls of an intermolecular force and an electrostatic force so that their diameter apparently becomes larger and particles collide the micro-fibers as in the case of the inertia collision; and
4) A mechanism in which particles are removed by means of electric charge collection of electret fibers.

However, it is seen from data shown in Japanese Patent Kokai Publication No. 284614/1990 that such a PTFE film cannot completely collect particles of which diameter is not more than 1 $\mu$m.

Generally, in order to increase a collection efficiency by collecting even fine particles, it is required of the filter medium to have a micro-structure of which pores are small. However, the micro-structure necessarily leads to a larger pressure loss across it so that an operation cost of a filtration apparatus is increased. It is contemplated that a thickness of the filter medium is made smaller so as not to increase the pressure loss.

There are two main processes for the production of the stretched thin PTFE porous film.

One process is to have a film having a reduced thickness prior to stretching the film. The other process is to increase a stretch ratio. The film thickness prior to the stretch which can be industrially used for the PTFE porous film is at least 30 to 50 $\mu$m since the film is produced by paste-extrusion followed by rolling. Considering its quality and yield, the film has to have a thickness of 100 to 200 $\mu$m prior to the stretch. Therefore, since it is difficult to make the film thickness smaller than that of the prior art before the stretch, there is no way for the reduction of the film thickness other than increase of the stretch ratio.

Japanese Patent Kokoku Publication No. 17216/1981 discloses an attempt to collect fine particles using a stretched PTFE porous film. However, it states that "FIG. 1 shows an effect of stretch along the monoaxial direction, and the biaxial- or all-direction stretch forms small fibers along such directions so that a spider net or cross-linked structure is formed, whereby a strength is increased. Since the numbers and the sizes of the voids between the polymer nodes and the small fibers are increased, the porosity is also increased.", which means that increase of the stretch ratio leads to the thinner film and the larger pore size thereof, whereby the collection efficiency is simultaneously reduced even though the pressure loss is reduced.

As described above, it has been contemplated that it is very difficult to produce a filter medium which has the smaller pores leading to the increased collection efficiency which causes the reduced pressure loss.

On the contrary, Japanese Patent Kokai Publication No. 202217/1993 discloses a PTFE porous film and its production technique in detail, which film has a small pressure loss and a high collection efficiency and which is produced by stretching a semi-sintered polytetrafluoroethylene material and heat-setting it at a temperature not lower than a melting point of a sintered polytetrafluoroethylene material.

In such a case wherein the semi-sintered polytetrafluoroethylene material is stretched, when a continuous and elongated PTFE porous film is produced which film has a thickness of about 1 to 5 μm with a uni- and biaxial area-based stretch ratio above 50-fold, openings, pinholes, voids, flaws and so on (which will be, hereinafter, generically referred to as "defect portions") may be formed in the film which defect portions can be often visually identified. When such a film is used in a filter unit, fine particles to be collected pass through the defect portions so that any means for example non-porous films are to be applied to cover such portions.

The air filter unit having a standard size (610 mm (height) ×610 mm (width)×65 mm (depth)) requires a filter medium area of about 10 m², and it has been found that it is considerably difficult to produce the filter medium having such a large area without any defect portion.

The defect portions are likely to be formed when the film thickness is smaller and the stretching ratio is larger. The following seem to be causes which lead to the formation of the defect portions: inclusion of contaminants in the PTFE fine powder as starting materials for the production of the PTFE porous film; presence of powder which has been subjected to an external force which prevents it from being fibrillated; and flaw occurrence during the film making step.

On the other hand, Japanese Patent Kokai Publication No. 214140/1983 discloses a process for prevention of pinhole formation in which at least two sintered PTFE films are fused together followed by stretching so as to suppress defect portions. This process essentially requires a step in which at least two sintered PTFE films are heated and fused together. Therefore, there are problems that not only the number of steps is increased but also a required amount of energy is increased since once sintered films are to be heated and fused. In addition, this process cannot increase the area-based stretch ratio since the films have been already sintered. For example, even 50-fold stretch ratio cannot be achieved so that a thin film cannot be produced.

Japanese Patent Kokoku Publication No. 25368/1983 discloses a process in which at least two unsintered (non-sintered) PTFE films are overlapped with one another (superposed one on another) followed by stretching at a temperature not lower than a melting point of the PTFE. This process intends to conveniently produce a relatively thick PTFE porous film and a problem is neither described nor taught in connection with the formation of the defect portions of the thin film. In fact, in the process of Japanese Patent Kokoku Publication No. 25368/1983 in which at least two unsintered PTFE films are heated at a temperature not lower than the PTFE melting point during stretching and so the unsintered films are melted together at the beginning of stretching, whereby behaviors of each film when stretched are not independent of those of the other film(s). Therefore, once there is formed a defect portion in one film, an effect of the defect portion is transmitted to the other film(s), which results in a composite film having the defect portions.

An object of the present invention to be achieved is, therefore, to provide a PTFE porous film, in particular a PTFE porous thin film having a small pressure loss, a small pore size, and very few defect portions.

Concretely, the object of the present invention to be achieved is to provide a PTFE porous film having, for example, an average pore diameter of 0.2 to 0.5 μm and an average pressure loss of 10 to 100 mm-H₂O for an air permeation velocity of 5.3 cm/sec.

Another object of the present invention to be achieved is to provide a filter unit having high performances by using such a PTFE porous film and also to improve the productivity of the filter unit.

[DISCLOSURE OF THE INVENTION]

It has been found that a PTFE porous film which achieves the above objects is provided by a process for the production of a polytetrafluoroethylene porous composite film characterized in that a composite composed of at least two overlapped longitudinally stretched films each obtained by paste-extruding and optionally semi-sintering thereafter a polytetrafluoroethylene produced by emulsion polymerization to have a film, and by stretching the film along its longitudinal direction at a temperature not higher than a melting point of a sintered polytetrafluoroethylene material is stretched together along its width direction under such conditions that stretching behaviors of each film are independent of those of the other film(s).

[BRIEF DESCRIPTION OF THE DRAWINGS]

FIG. 3 shows one example of crystal melting curves of an unsintered PTFE and a sintered PTFE obtained by using DSC for the measurement of a sintering degree; and FIG. 4 shows one example of crystal melting curves of a semi-sintered PTFE obtained by using DSC for the measurement of a sintering degree.

Figure 1:
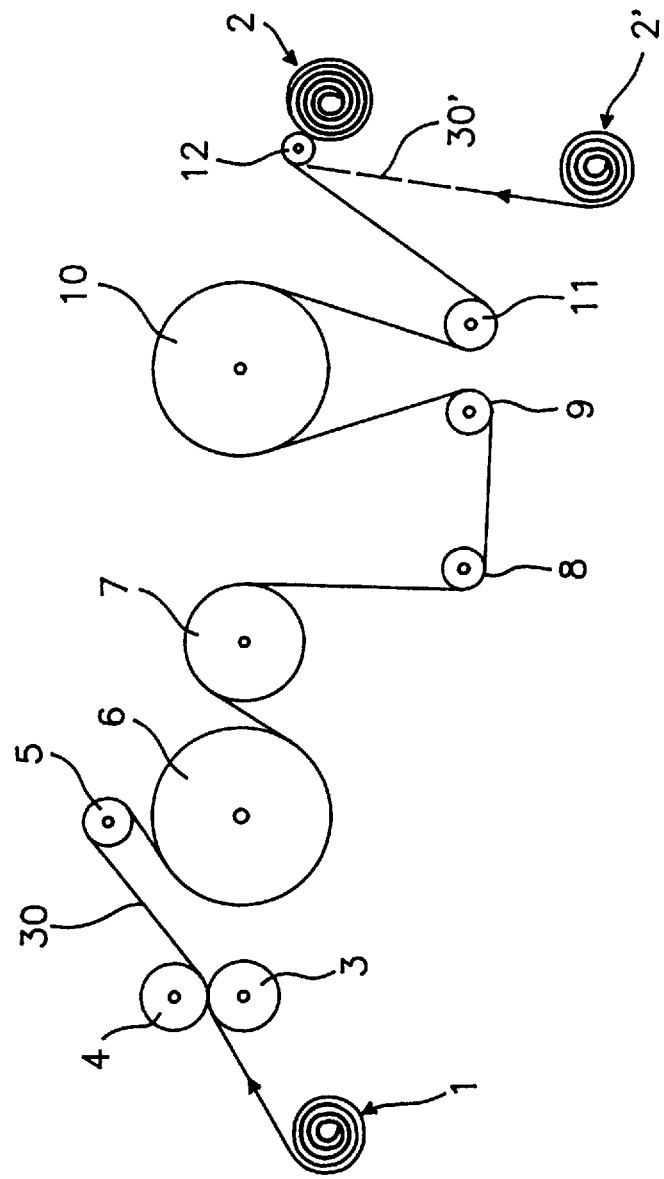
FIG. 1 schematically shows an apparatus for stretching a PTFE film along a longitudinal direction of the film.

In the drawings, numeral 1 indicates a film feed roll, numeral 2 does a wind-up roll, numeral 13 does a film feed roll, numeral 14 does a feed roll, numeral 15 does a preheating oven, numeral 16 does an oven for stretching along a width direction, numeral 17 does a heat setting oven, numerals 18 and 19 do lamination rolls, numeral 20 does a wind-up roll, numeral 21 does a wind-up drum for a stretched film along a width direction, numerals 22 and 23 do feed rolls for support materials, numeral 30 does a PTFE film, numeral 30' does a stretched PTFE film, numeral 40 does a PTFE film composite and numeral 50 does a support material.

[DETAILED DESCRIPTION OF THE INVENTION]

The polytetrafluoroethylene porous composite film obtained by the process according to the present invention has an average pore diameter of about 0.2 to 0.5 μm and an average pressure loss of about 10 to 100 mm-H₂O for an air permeation velocity of 5.3 cm/sec. at room temperature.

In the present invention, the phrase "such conditions that stretching behaviors of each film are independent of those of the other film(s)" is intended to mean conditions under which behaviors of each film which is being stretched along its width direction give substantially no physical effect on stretching behaviors of the other film(s) which is also being stretched.

For such conditions, various embodiments can be concretely contemplated and basic ideas thereon are as follow:

First, that at least two films overlap means that a defect portion(s) formed in one film is compensated by the other remaining film(s). Namely, when a plurality of films (for example two films) is stretched, a formation probability at which every film has a defect portion at the same position would be the plural power (for example, the second power)

of a formation probability at which a single film alone has the defect portion at that position. So, even though each film has some defect portions, the formation probability of those defect portions is not so large, and therefore, the composite film produced by overlapping a plurality of films does substantially not have the defect portions as a whole of the composite film. On the basis of this consideration, it is better to increase the number of the films to be overlapped from a viewpoint of the defect portion formation, but the increased number of the films causes a problem of an increased pressure drop. Therefore, the number of the films to be overlapped is properly selected depending on an application of the porous composite film (for example, depending on an acceptable pressure loss and an acceptable formation probability of the defect portions).

With respect to the present PTFE porous composite film, the composite of two laminated films has substantially no problem of the defect portions for the practical applications. Therefore, according to the present invention, the number of the films to be overlapped is at least two, preferably 2 to 4 and more preferably 2 to 3. For example, it is sufficient that two films are overlapped.

It is, in principle, possible to obtain a composite film of which defect portion formation is suppressed as a whole composite film by overlapping porous films which have been conventionally produced. However, a process for the production of the porous composite film in which each film is individually produced and all the films are overlapped in the final step is not preferable since the productivity of the composite film is degraded due to, for example, the increased number of the steps and damages of the films when they are overlapped. In addition, the composite film thus produced leads to a highly reduced particle collection efficiency when it is used in the filter unit, which is not preferable.

Therefore, it is preferable to obtain the composite film in a condition in which each films has been already overlapped together in the final step, not to obtain the composite film by finally overlapping films in the final step each stretch of which has been completed. In order to carry out the preferable manner, final stretching should be carried out under such a condition that at least two films have been overlapped. Upon the stretch, an effect of a defect portion which has been already present or will be formed should not be transmitted to the other remaining film(s). Namely, no stretching behaviors of one film should affect those of the other remaining film(s). For example, in a case wherein stretching behaviors of the two overlapped films affect one another (for example if two films are under such a condition that they are bonded to a certain extent), when a flaw is formed in one film due to some reason, the flaw is enlarged since a portion around the flaw of the film cannot withstand a stretching force. Upon enlargement of the flaw portion, the other film which is bonded to the film having the flaw portion is simultaneously stretched together and almost a double stretching force is applied to the other film without a flaw. Then, the other film cannot withstand such a large force and is broken, so that the other film also has a defect portion at the same position just below the original defect portion of said one film, which results in formation of a defect portion of the composite film as a whole.

As one manner by which the stretching behaviors of the overlapped films do not affect one another, the process of the first aspect according to the present invention employs a procedure to stretch along a longitudinal direction an unsintered PTFE film produced by paste-extrusion of a polytetrafluoroethylene obtained by suspension polymerization in such a condition that the film is still unsintered.

Alternatively, the process of the second aspect according to the present invention employs a procedure to semi-sinter an unsintered PTFE film produced by paste-extrusion of a polytetrafluoroethylene obtained by suspension polymerization and then to stretch the semi-sintered film along its longitudinal direction.

The above processes are based on that the unsintered PTFE films which have been stretched along the longitudinal direction have weak adhesion to one another provided that a temperature upon width direction stretch of the longitudinally stretched films is sufficiently low, so that stretching behaviors of each film do not affect stretching behaviors of the other remaining film(s), and also based on that the semi-sintered films which have been stretched along the longitudinal direction have weak adhesion to one another so that stretching behaviors of each film do not affect stretching behaviors of the other remaining film(s) even though the stretch along the width direction is carried out at a temperature not lower than the melting point of the PTFE.

Therefore, the present invention in the first aspect provides a process for the production of a polytetrafluoroethylene porous composite film comprising the steps of:

obtaining a PTFE film by paste-extruding a mixture comprising polytetrafluoroethylene powder produced by emulsion polymerization and a liquid lubricant, stretching thus obtained film along its extrusion direction (its longitudinal direction, MD (machine direction)) at a temperature not higher than a melting point of a sintered PTFE material and forming a composite in which as least two thus stretched PTFE films are overlapped, stretching thus formed composite along its width direction (which is perpendicular to the longitudinal direction, TD (transverse direction)) to form a stretched composite which is stretched by at least 50-fold of a stretch ratio based on a stretched area after the longitudinal direction stretch and the width direction stretch; and optionally heat-setting the resulted stretched composite.

Also, the present invention in the second aspect provides another process for the production of a polytetrafluoroethylene porous composite film comprising the steps of:

obtaining a PTFE film by paste-extruding a mixture comprising polytetrafluoroethylene powder produced by emulsion polymerization and a liquid lubricant, semi-sintering thus obtained PTFE film;

stretching thus semi-sintered PTFE film along its extrusion direction (its longitudinal direction, MD (machine direction)) at a temperature not higher than a melting point of a sintered PTFE material and forming a composite in which as least two thus stretched PTFE films are overlapped, stretching thus formed composite along its width direction (which is perpendicular to the longitudinal direction, TD (transverse direction)) to form a stretched composite which is stretched by at least 50-fold of a stretch ratio based on a stretched area after the longitudinal direction stretch and the width direction stretch; and optionally heat-setting the resulted stretched composite.

In the process of the first or second aspect of the present invention, the composite in which at least two thus stretched PTFE films are overlapped (which is sometimes referred to as also "film composite") is obtained by, for example, overlapping at least two films one on the other(s) each of which has been separately stretched along the longitudinal direction, or obtained by overlapping beforehand at least two films produced by the extrusion followed by stretching thus overlapped films, or obtained by the combination of the above two features; namely by stretching at least one extruded film along its longitudinal direction and overlapping it, immediately after the stretch, on at least one other film which have been already stretched along its longitudinal direction.

The PTFE powder used in the present invention is produced by the emulsion polymerization, and it is, in particular, so-called fine powder produced by coagulation of an aqueous dispersion from the polymerization. A molecular weight of the used PTFE is not specifically limited, and it is sufficient that a number-average molecular weight is about 2.5 million to 10 million and preferably about 3 million to 8 million.

In the present invention, the PTFE film is obtained by paste-extruding the mixture comprising the PTFE powder and the liquid lubricant or by such paste-extrusion followed by optional rolling. The liquid lubricant functions as an extrusion auxiliary, and, for example, solvent naphtha, white oil and so on can be used as the lubricant. A composition of the mixture is, for example, such that 20 to 30 parts by weight of the liquid lubricant is mixed based on 100 parts by weight of the PTFE powder.

Usually, such a mixture is paste-extruded into a rod at for example 50° to 70° C. followed by rolling at for example 50° to 70° C. and then the rod is heated and dried at 200° to 250° C. so as to remove the liquid lubricant to have a unsintered PTFE film.

A series of steps for the production of the mixture and the unsintered PTFE film is described in, for example, Polyflon Handbook (Daikin Industries Co. edited in 1983), the disclosures of which can be incorporated herein by the reference. A thickness of the used PTFE film prior to the stretch is not specifically limited and properly selected depending on a stretch ratio which will be explained below. When one single film of the films which constitute the final composite film has a thickness of about 0.1 to 5 $\mu$m and preferably about 0.2 to 5 $\mu$m, the film prior to the stretch has a thickness of for example about 30 to 300 $\mu$m and preferably about 50 to 200 $\mu$m.

In the first aspect of the present invention, the PTFE film thus obtained is stretched at a temperature not higher than a melting point of a sintered PTFE material along an extrusion direction on the above extrusion (or a longitudinal direction of the film or MD). This stretch temperature is very important and when the stretch temperature is low, the following width direction stretch causes a larger pore diameter of the porous film with increase of the stretch ratio. Therefore, a lower limit of the stretch temperature along the longitudinal direction would be about 250° C. In the present description, the sintered PTFE material is intended to mean a material which has been obtained by thermally treating PTFE powder or a form thereof at a temperature of 350° to 400° C. which powder is produced by polymerization followed by coagulation. The melting point of the sintered PTFE material is a peak temperature of an endothermic curve of the sintered PTFE material measured by a differential scanning calorimeter, and it depends on an average molecular weight and so on of the used PTFE and it is usually about 327° C.

Therefore, in the process of the first aspect according to the present invention, the temperature upon the longitudinal stretch is preferably in 250° to 320° C., more preferably in 270° to 320° C., and for example about 300° C. By the selection of such temperature as the longitudinal stretch temperature, the pore diameter is not substantially increased even when the stretch ratio of the following stretch along the width direction is increased.

In the process of the second aspect according to the present invention, the temperature upon the longitudinal stretch is not so strict as that in the process of the first aspect, and it is usually a temperature not higher than the melting point of the sintered PTFE material, and it may be preferably selected in the range of 150° to 320° C.

In the process of the second aspect according to the present invention, the PTFE film thus obtained is converted to the semi-sintered material prior to the stretch along its longitudinal direction. In the present description, the semi-sintered material means a material obtained by thermally treating the PTFE at a temperature which is not lower than the melting point of the sintered PTFE material and also which is not higher than melting point of the unsintered PTFE material. In the present description, the unsintered PTFE material means PTFE powder which is produced by polymerization and coagulation and a form made of the powder which has not been thermally treated. The melting point of the unsintered PTFE material is a peak temperature of an endothermic curve of the unsintered PTFE material measured by the differential scanning calorimeter, and it depends on an average molecular weight and so on of the used PTFE as in the case of the melting point of the sintered PTFE material and it is usually about 345° C. In order to have the semi-sintered PTFE material, the PTFE film is heated to a temperature of about 327° to 345° C., preferably 335° to 342° C. and for example 338° C.

In the process of the second aspect according to the present invention, an extent of sintering of the semi-sintered material, namely a sintering degree, is not specifically limited, and it is preferably about 0.1 to 0.8 and more preferably about 0.15 to 0.7. This sintering degree is fully described in Japanese Patent Kokai Publication No. 202217/1993 and it can be defined as explained below. The sintering degrees of at least two films in the present invention may be the same or different from one another.

The longitudinal stretch ratio is also not specifically limited in the both processes. Considering the thicknesses of the PTFE films prior to the stretch and the final thickness of the PTFE porous composite film, it is preferable to select the longitudinal stretching ratio such that the area-based stretch ratio in combination with the width direction stretch and the longitudinal direction stretch (which is a ratio of a film surface area after the stretch to a film surface area prior to the stretch) which will be explained below is at least 50-fold, preferably at least 75-fold and more preferably at least 100-fold.

The longitudinal direction stretch ratio is usually at least four-fold, preferably at least eight-fold and more preferably at least ten-fold. In the present invention, selection of such a stretch ratio has led to a result that the pore diameter does substantially not increase even though the stretch ratio is increased.

At least two thus longitudinally stretched PTFE films are overlapped to have a PTFE film composite. Any process may be employed to have such a PTFE film composite as described above.

For example, each of the PTFE films which has been stretched along the longitudinal direction may be wound up separately in one step and those films may be overlapped in another step to have the PTFE film composite. Also, at least two PTFE films may be overlapped prior to stretching along the longitudinal direction, and then the overlapped films may be longitudinally stretched to have the PTFE film composite. In addition, at least one already longitudinally stretched film may be overlapped on at least one film immediately after the latter film has just prepared by stretching at least one unstretched PTFE film, so that the film composite is obtained. In this step for the formation of the film composite, the number of the films which constitute the film composite is, as described above, at least two, preferably 2 to 4, more preferably 2 to 3, and for example 2.

Then, the resulted film composite is stretched along its width direction (namely, a direction perpendicular to the longitudinal direction, TD).

In the process of the first aspect according to the present invention, with respect to the stretch along the width direction, the stretch temperature is important. When the width direction stretch temperature is too high, the pore diameter of the final PTFE composite film is increased. To the contrary, when the stretch temperature is too low, stretchability is degraded so that it is impossible to stretch the composite to such an extent that a thin film having a low pressure loss is obtained. When the stretch temperature along the width direction is employed in about 100° to 200° C., preferably in 120° to 200° C. and for example 150° C., a thin composite film can be produced without a too large pore.

In the process of the first aspect according to the present invention, a stretch ratio along the width direction is so selected that it provides, in combination with the longitudinal stretch ratio, the area-based stretch ratio of at least 50-fold, preferably at least 75-fold, and more preferably at least 100-fold. The stretch ratio along the width direction is, therefore, selected to be usually 10 to 100-fold, preferably 12 to 90-fold, particularly 15 to 70-fold and for example 30-fold. When the width direction stretch has been finished, the film composite is optionally heat-set, if necessary, so as to make the film composite into one piece. The heat-setting is usually carried out at a temperature not lower than the stretching temperature. It is to be noted that when the heat-setting is carried out at a temperature not lower than the melting point of the sintered PTFE material, the pore diameter of the composite film is unpreferably increased so that it becomes larger than an intended pore diameter.

In the process of the second aspect according to the present invention, the stretch along the width direction is carried out at a temperature usually in 200° to 420° C., preferably not lower than the melting point of the sintered PTFE material, more preferably in 330° to 400° C. and for example at 360° C. The selection of the stretch ratio of the width direction stretch is the same as that of the process of the first aspect. When the width direction stretch has been finished, the film composite is optionally heat-set, if necessary, so as to make the film composite into one piece. The heat-setting is carried out at a temperature not lower than the stretch temperature. It is to be noted that the heat-setting at a temperature not lower than the melting point of the sintered PTFE material advantageously leads to uniform pressure loss distribution over the resulted composite film.

In the both processes, when the film composite is at a too low temperature, it is preferably preheated before the width direction stretch. The preheating temperature may be equal to or lower than the width direction stretch temperature. However, when it is higher than the melting point of the sintered PTFE material, sintering of the longitudinally stretched films unpreferably proceeds.

In the both processes, the heat-setting treatment as the final step is not always necessary as described above. The stretched composite film which is free from any tension applied thereto is likely to shrink soon so that handling of the composite film becomes not easy. This problem is overcome by laminating the stretched composite film with a support.

The PTFE porous composite film produced by the process according to the present invention may be used before or after the heat-setting treatment. Even though the composite film is heat-set, it is preferable, not to use it as it is, to have it carried by the support for the purpose of reinforcement, as in the case of the composite film produced without heat-setting. The support preferably has a strength to carry the composite film as well as a small pressure loss across the support. By laminating the composite film with the support, handling characteristics of the composite film are improved so that it is easily used in, for example, an air filter after it is folded into a pleat structure.

A material which can be used as the support is suitably selected from, for example, a non-woven fabric, a woven fabric, a mesh, a knit and any other material which is porous. Also, a material of which the support is made may be, for example, a polyolefin (such as a polyethylene), a nylon, a polyester, Aramide or any combination thereof (for example a composite such as a non-woven fabric made of core/sheath structure fibers and a two layer non-woven fabric of a lower melting point material and a higher melting point material). In addition, a fluorine based porous material may be exemplified.

Particularly, the non-woven fabric made of the core/sheath structure fibers (for example, ELEVES (registered trademark) commercially available from UNITIKA LTD.) and the two layer non-woven fabric made of the lower melting point material and the higher melting point material (for example, ELEFIT (registered trademark) commercially available from UNITIKA LTD.) are preferred. Those support materials do not shrink during the lamination. In addition, the PTFE porous composite film laminated with such a support material is readily to be processed and a folding pitch (thus a number of pleats) is easily increased when the composite is to be formed into a filter element for an ULPA/HEPA filter.

When the lamination is carried out as the above, the support material may be laminated on either side or both sides of the PTFE composite film of the present invention. When the one side lamination is employed, the other exposed side of the PTFE composite film is likely to be mechanically damaged and so the both side lamination is preferable. Any manner by which the lamination is carried out may be employed. Preferable manners are thermocompression bonding in which a portion of the support material is melted, thermocompression bonding in which, a polyethylene, a polyester, a PFA (tetrafluoroethylene/perfluoroalkylether copolymer) or so on is used as an adhesive, and thermocompression bonding in which a hot melt resin is used. When the support material is to be laminated, it is not a so preferable manner to wind up the porous composite film according to the present invention before the lamination from viewpoints of the less strength and the shrinkage of the composite film. It is preferable to laminate the composite film with the support material immediately after the width direction stretch followed by the optional heat-setting before winding-up the composite film.

In the third aspect, the present invention provides a PTFE porous composite film which is produced by the process of the first or second aspect. When the composite film is composed of, for example, two PTFE films, the composite film has an average pore diameter of about 0.2 to 0.5 $\mu$m and an average pressure loss of 10 to 100 mm-$H_2O$, preferably 10 to 60 mm-$H_2O$ for an air permeation velocity of 5.3 cm/sec. at room temperature. For example, when the composite film is composed of three PTFE films, it has an average pore diameter of about 0.2 to 0.5 $\mu$m and an average pressure loss of 15 to 100 mm-H₂O. These composite films have very preferable properties particularly for the use of the filter element.

In other words, the present invention provides a polytetrafluoroethylene porous composite film composed of at least two, preferably 2 to 4, overlapped polytetrafluoroethylene films which have been stretched along their longitudinal and width directions, which composite film has an average pore diameter of about 0.2 to 0.5 μm, an average pressure loss of 10 to 100 mm-H₂O for an air permeation velocity of 5.3 cm/sec. at room temperature and substantially no leak point which is measured according to JACA. With respect to the porous composite film according to the present invention, when the number of the PTFE films which constitute the porous composite film is increased, the average pore diameter does not change so much but the pressure loss is almost linearly increased. Each PTFE film which constitutes the PTFE porous composite film according to the present invention has a thickness of usually about 0.1 to 5 μm, preferably 0.2 to 5 μm and an overall thickness of the porous composite film is usually about 0.2 to 10 μm, preferably 0.4 to 10 μm.

In the fourth aspect, the present invention provides a filter unit comprising a PTFE porous composite film at least one side of which is laminated with a support material.

The processes according to the present invention can be carried out by any apparatus which can stretch a film along two directions. They are distinguished from the prior art process for the production of the PTFE porous film by only that the film composite composed of at least two films which are overlapped one on the other(s) is stretched upon the width direction stretch. In a conventional process in which a single film sheet is stretched, the single film is merely replaced with a film composite, and the present process for the production of the porous composite film can be carried out by the conventional stretching process.

Figure 2:
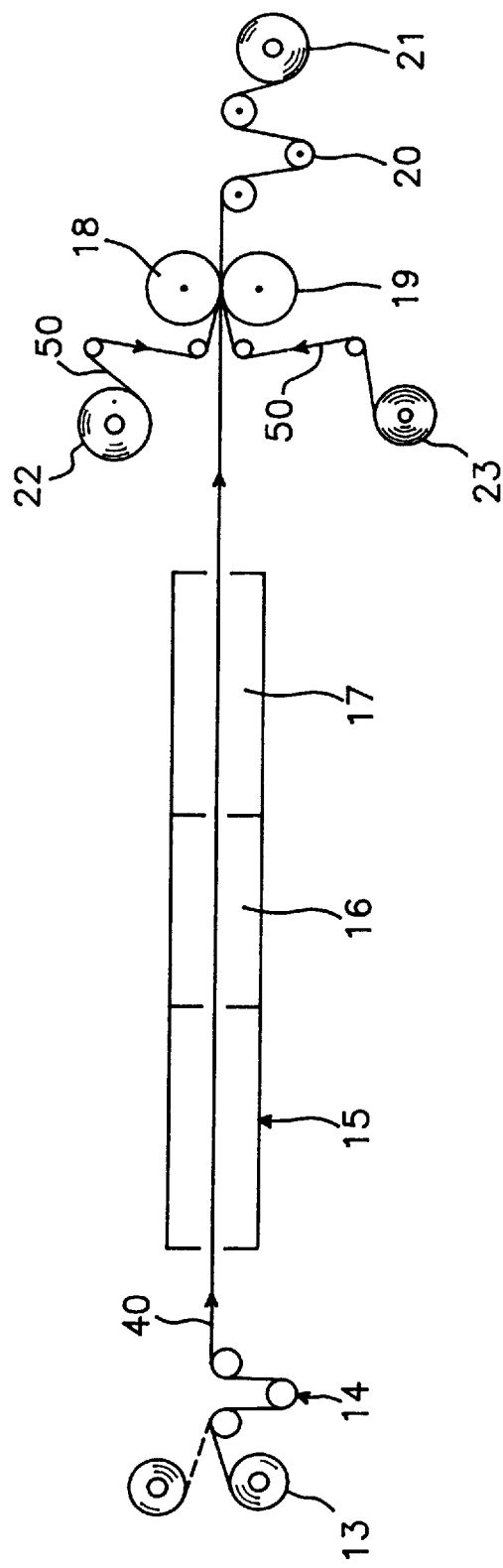
FIG. 2 schematically shows an apparatus for stretching a PTFE film along a width direction of the film and a lamination apparatus.

For example, an apparatus for stretching along a longitudinal direction schematically shown in FIG. 1 and an apparatus for stretching along a width direction schematically shown in FIG. 2 can be concretely used.

In the apparatus shown in FIG. 1, a wound up extruded PTFE film 30 is fed from a roll 1 by rolls 3 and 4. The film 30 is passed by way of a roll 5, rolls 6 and 7 of which peripheral velocities are different from each other, rolls 8, 9, and 10, and rolls 11 and 12, and then wound up by a wind-up roll 2.

In FIG. 1, the PTFE film 30 may be a PTFE composite in which at least two PTFE films are overlapped. Alternatively, each single PTFE film sheet is stretched and wound up by each wind-up roll 2, and the longitudinally stretched PTFE films are overlapped which films are fed from a plurality of such wind-up rolls 2 to have the film composite. Also, as shown in FIG. 1 using a broken line, a stretched film 30' is fed from a roll 2' by which a longitudinally stretched film has been wound up beforehand and it is overlapped on another film 30 which has been just stretched, and then the both films are wound up by a roll 2 as the film composite. In addition, as shown in FIG. 2 using a broken line, it is also possible to overlap a film with other film(s) when it is fed from a feed roll so as to obtain the film composite.

The film composite composed of the longitudinally stretched films obtained in the apparatus shown in FIG. 1 is stretched along its width direction by the apparatus shown in FIG. 2. Namely, the film composite 40 is delivered from a feed roll 13, passing roll 14 and a preheating oven 15 followed by stretching in a width direction stretching oven 16, and then a heat setting oven 17 where the composite is heat-set to have the PTFE porous composite film of the present invention. Then, support materials 50 which are delivered from support material feed rolls 22 and 23 are laminated on each side of the PTFE porous composite film by lamination rolls 18 and 19. The laminated PTFE composite film is wound up by a wind-up roll 21 by way of a roll 20.

[Industrial Applicability]

The PTFE porous composite film of the present invention has very few defect portions. As explained in Examples below, when the porous composite film is used in a filter unit, it has been found that substantially no leak point was observed during a filter unit performance test according to JACA (Japanese Air Cleaning Association).

Such a PTFE porous composite film according to the present invention, preferably in the form of the laminate with the supporting material(s), is incorporated as an air filter into a ceiling of, for example, a cleanroom so that a super-cleaned atmosphere can be created. Also, the composite film can be incorporated into a semiconductor production apparatus (such as a coater developer, a stepper, an etching diffusion furnace, a washing equipment and so on) so that air which is to be in direct contact with semiconductor tips can be cleaned, whereby a yield of the semiconductor tips is effectively improved.

In addition, the PTFE porous composite film according to the present invention can be used as a filter unit for liquids. When the film is used for the liquid filter unit, a permeation flux across the unit increases more than 10 times larger than that of the currently usually used filter medium having the same pore size, so that a filtration treatment can be carried out with a larger amount of a treated liquid or a reduced operation cost. In the present description, the filter unit is intended to mean a member which is made of the porous composite film of the present invention laminated with the support material(s) and which can be incorporated into a filtration apparatus (filter) as a filter medium.

Further, when a liquid is vaporized across the PTFE porous composite film of the present invention as a partition, a cleaned gas is obtained without any fine particles which have been contained in the liquid. Thus, when the composite film is used as a partition of a moistening apparatus, clean steam can be formed.

According to the present invention, an extremely thin PTFE porous composite film can be produced in an industrial scale, and the PTFE porous composite film can be used for an application in which water repellency or gas permeability is required.

Sintering Degree

In the present invention, the sintering degree of the semi-sintered PTFE material is measured as follows:

First, a sample of 3.0±0.1 mg is weighed out from the unsintered PTFE material and a crystal melting curve thereof is obtained with using the sample. Then, a sample of 3.0±0.1 mg is weighed out from the semi-sintered PTFE material and a crystal melting curve thereof is obtained with using the sample.

The crystal melting curves are obtained by using a differential scanning calorimeter (hereinafter, referred to as "DSC", for example DSC-Type 50 manufactured by Shimadzu Corp.). First, the sample of the unsintered PTFE material is charged in a aluminum pan of the DSC and a heat of melting of the unsintered PTFE material and a heat of melting of the sintered PTFE material are measured in the following procedures:

(1) The sample is heated to 250° C. at a heating rate of 50° C./min. and then heated from 250° to 380° C. at a heating rate of 10° C./min. One example of the crystal melting curve obtained during these heating steps is shown as Curve A in FIG. 3. A peak position of an endothermic curve during these heating steps corresponds to the "a melting point of the unsintered PTFE material" or the "a melting point of the PTFE fine powder".

(2) Immediately after heating to 380° C., the sample is cooled to 250° C. at a cooling rate of 10° C./min.

(3) The sample is again heated to 380° C. at a heating rate of 10° C./min.

One example of the crystal melting curve obtained during the processing step (3) is shown as Curve B in FIG. 3. A peak position of an endothermic curve during the heating step (3) corresponds to "a melting point of the sintered PTFE material".

Then, with respect to a semi-sintered PTFE material, the crystal melting curve is recorded according to the step (1). One example of the crystal melting curve obtained during this heating step is shown in FIG. 4. Each of the heats of melting of the unsintered PTFE material, the sintered PTFE material and the semi-sintered PTFE material is proportional to an area surrounded by the endothermic curve and a base line, and the heat of melting is automatically calculated when DSC-Type 50 of Shimadzu Corp. is used and once an analyzing temperature is set therein.

Thus, the sintering degree is calculated according to the following equation:

$$\text{Sintering Degree} = (\Delta H_1 - \Delta H_3)/(\Delta H_1 - \Delta H_2)$$

wherein $\Delta H_1$ is the heat of melting of the unsintered PTFE material, $\Delta H_2$ is the heat of melting of the sintered PTFE material and $\Delta H_3$ is the heat of melting of the semi-sintered PTFE material. Japanese Patent Kokai Publication No. 152825/1984 describes the semi-sintered PTFE material in detail, which publication may be herein incorporated with the reference.

The present inventions will be, hereinafter, explained with reference to Examples, to which the present inventions are not limited.

[EXAMPLES]

Example 1

PTFE fine powder having a number-average molecular weight of 6.2 million (manufactured as "Polyflon Fine Powder F104U" by Daikin Industry Ltd.) was used. Hydrocarbon oil (manufactured as "Isoper" by Esso Oil Corp.) as the extrusion auxiliary was added in an amount of 27 parts by weight to 100 parts by weight of the PTFE fine powder, and paste-extrusion was carried out to produce a rod. Then, the rod is calendered at a speed of 50 m/min. using calender rolls heated to 70° C. to form a PTFE film. The film was dried by passing through a hot air drying oven at 250° C. to remove the extrusion auxiliary to have an unsintered PTFE film having an average thickness of 100 µm, an average width of 150 mm and a specific gravity of 1.55.

This unsintered film was thermally treated in an oven at 338° C. for 45 seconds. to have a continuous semi-sintered PTFE film having a sintering degree of 0.40. Through the semi-sintering step, the average width and the specific gravity of the film at room temperature were changed to 140 mm and 2.25, respectively, but the thickness of the film was almost unchanged.

Then, the semi-sintered film was first stretched along its longitudinal direction by a stretch ratio of 12.5-fold using the apparatus shown in FIG. 1. That is, the semi-sintered film 30 was delivered from the semi-sintered film feed roll 1 by way of the rolls 3 and 4 to the rolls 6 and 7 where the film was stretched along the same direction as the calendering direction (thus the extrusion direction), i.e. along the longitudinal direction of the film. The stretched film was wound up by the wind-up roll 2 by way of the rolls 8, 9, 10, 11 and 12.

Conditions of the longitudinal stretch were as follows:
Feed Speed of Rolls 3 and 4: 0.87 m/min.
Peripheral Speed of Roll 6 (Temperature: 270° C.): 4 m/min.
Peripheral Speed of Roll 7 (Temperature: 270° C.) 10.87 m/min.
Peripheral Speed of Roll 10 (Temperature: room temp.) 10.87 m/min.
Wind-Up Speed of Roll 10.87 m/min.
(Clearance between Peripheries of Rolls 6 and 7: 5 mm)

The film had an average width of 98 mm at room temperature after stretching.

With consideration of the shrinkage along the width direction, the area-based stretch ratio was calculated to be 8.75-fold (=[10.87/0.87]/[140/98]).

Then, two longitudinally stretched films each delivered from the wind-up roll were rewound up with their overlapping condition to have a PTFE film composite of the longitudinally stretched PTFE films.

Thereafter, the longitudinally stretched film composite was stretched along its width direction by 30-fold and then heat-set using the apparatus shown in FIG. 2 equipped with clip members which can continuously pinch each edge of the longitudinally stretched film composite. Conditions of the width direction stretch and the heat-setting were as follows:

Film Composite Running Speed: 10 m/min.
Preheating Oven (15) Temperature 305° C.
Width Direction Stretching Oven (16) Temperature 360° C.
Heat-Setting Oven (17) Temperature 380° C.

As a result, the longitudinal and width combination stretch ratio (area-based stretch ratio) was about 260-fold based on the stretched film area.

Comparative Example 1

Only a single longitudinally stretched film which was produced in Example 1 was stretched along its width direction by 30-fold under the same conditions as those of Example 1.

Comparative Example 2

Similarly to Example 1, an unsintered (unstretched) film was produced having a double thickness of that of the unsintered film obtained in Example 1 (thus, the thickness was 200 µm). The unsintered film was thermally treated for 49 seconds in an oven at 338° C. to form a continuous semi-sintered PTFE film having a sintering degree of 0.40. The unsintered film had a width of 145 mm and a specific gravity of 1.55 at room temperature prior to the semi-sintering step, and had a width of 135 mm and a specific gravity of 2.25 at room temperature after the semi-sintering step, but the thickness was almost unchanged.

Then, one semi-sintered film thus obtained was stretched along its longitudinal direction by 12.5-fold and along its width direction by 30-fold and then heat-set under the same conditions as those of Example 1.

Example 2

Under the same conditions as those of Example 1 except that the temperature of the width direction stretching oven was 320° C., two longitudinally stretched porous films obtained in Example 1 were overlapped and, the width direction stretch by 30-fold and the heat-setting were carried out.

Example 3

After overlapping two semi-sintered films obtained in Example 1, they were longitudinally stretched by 12.5-fold under the same conditions as those of Example 1 using the apparatus shown in FIG. 1 to have a PTFE film composite. Then, the composite of the two overlapped longitudinally stretched films was stretched along the width direction by 30-fold and heat-set using the apparatus shown in FIG. 2.

Example 4

The unsintered film produced in Example 1 (unstretched) was thermally treated at 338° C. for 30 seconds in an oven to have a continuous semi-sintered film having a sintering degree of 0.30. After the thermal treatment, the film had a width of 150 mm and a specific gravity of 2.20 and the thickness of the film was almost unchanged.

The semi-sintered film was first stretched along its longitudinal direction by a ratio of 20-fold using the apparatus shown in FIG. 1.

Conditions of the longitudinal stretch were as follows:
Feed Speed of Rolls 3 and 4: 0.52 m/min.
Peripheral Speed of Roll 6 (Temperature: 300° C.): 4 m/min.
Peripheral Speed of Roll 7 (Temperature: 300° C.) 10.52 m/min.
Peripheral Speed of Roll 10 (Temperature: room temp.) 10.52 m/min.
Wind-Up Speed of Roll 2 10.87 m/min.
(Clearance between Peripheries of Rolls 6 and 7: 5 mm)

The film had a width of 100 mm at room temperature after the stretch. The area-based stretch ratio was calculated to be 13.3-fold.

Then, two of the longitudinally stretched films were overlapped and rewound up followed by stretching along their width directions by 28-fold and then heat-setting with using the same apparatus as in Example 1. Conditions of the width direction stretch and the heat-setting were as follows:

Film Composite Running Speed: 10 m/min.

Preheating Oven Temperature 305° C.

Width Direction Stretching Oven Temperature 380° C.

Heat-Setting Oven Temperature 395° C.

As a result, the longitudinal and width combination stretching ratio was about 370-fold based on the stretched film area.

Example 5

The longitudinally stretched film obtained in Example 1 and the longitudinally stretched film obtained in Example 4 were overlapped and rewound up followed by stretching along their width direction by 30-fold and then heat-setting under the same conditions as in Example 1 so as to produce a porous composite film composed of the semi-sintered films having the different sintering degrees.

Example 6

The unsintered and unstretched film which was produced in Example 1 was first stretched as it is (therefore, without semi-sintering) along its longitudinal direction by a ratio of 10-fold using the same apparatus as in Example 1. Conditions of the longitudinal stretch were as follows:

Feed Speed of Rolls 3 and 4: 1.11 m/min.
Peripheral Speed of Roll 6 (Temperature: 300° C.): 4 m/min.
Peripheral Speed of Roll 7 (Temperature: 300° C.) 11.11 m/min.
Peripheral Speed of Roll 10 (Temperature: room temp.) 11.11 m/min.
Wind-Up Speed of Roll 2 11.11 m/min.
(Clearance between Peripheries of Rolls 6 and 7: 5 mm)

The film had a width of 127 mm at room temperature after the stretch. The area-based stretch ratio was calculated to be 8.5-fold.

Then, two of the longitudinally stretched (unsintered) films were overlapped and rewound up followed by stretching along their width direction by 30-fold and then heat-setting with using the same apparatus as in Example 1. Conditions of the width direction stretch and heat-setting were as follows:

Film Composite Running Speed: 10 m/min.

Preheating Oven Temperature 200° C.

Width Direction Stretching Oven Temperature 200° C.

Heat-Setting Oven Temperature 200° C.

As a result, the longitudinal and width combination stretch ratio was about 250-fold based on the stretched film area.

Example 7

After overlapping two unsintered and unstretched films which were produced in Example 1, they were longitudinally stretched by 10-fold under the same conditions as those of Example 6 using the apparatus shown in FIG. 1 to have an unsintered longitudinally stretched PTFE film composite. Then, the composite of the two overlapped longitudinally stretched films was stretched along the width direction by 30-fold and heat-set under the same conditions as those of Example 6 using the apparatus shown in FIG. 2.

Example 8

Two of the longitudinally stretched porous films produced in Example 6 were overlapped to have a film composite, which was stretched by 30-fold along its width direction and heat-set under the same conditions as those of Example 6 except that the temperature of the preheating oven was 150° C. and the temperature of the width direction stretch oven was 150° C.

The PTFE porous films and the PTFE porous composite films were tested with respect to a thickness ($\mu$m) of the film, an average pore diameter ($\mu$m) of the film and a pressure loss (mm-$H_2O$) across the film prior to the lamination with support materials, and a pressure loss (mm-$H_2O$) and its coefficient of variation after the lamination with the support materials, and an average number of particle leak points and a pressure loss (mm-$H_2O$) across a filter unit comprising the porous film to which the support materials were laminated.

Manners of the tests will be briefly explained below:
(Film Thickness)

A thicknessmeter (manufactured as 1D-110 MH by Mitutoyo Corp.) was used to measure an overall thickness of five overlapped porous films or composites films followed by dividing the measured overall thickness by five to have a thickness value of one film or composite film.
(Average Pore Diameter)

A mean flow pore size (MFP) measured according to ASTM F-316-86 was defined as the average pore size.

Practical measurement was carried out using Coulter Porometer (manufactured by Coulter Electronics Co., England).
(Pressure Loss prior to/after Lamination of Support Material)

A film piece having a size of 15 cm×15 cm was cut out of a produced porous film, and it was set on a tubular filter holder having an inner diameter of 11 cm. Then, a pressure of 0.1 kg/cm² at an inlet side was applied to the filter holder, and an air flow rate which exited from an exit side of the holder was controlled to be 5.3 cm/sec. by using a flow meter (manufactured by Kojima Seisakusho). A pressure loss at that time was measured using a manometer (measurement temperature: room temperature).

With respect to the tests after the lamination, each of the biaxially stretched PTFE porous films and composite films produced in Examples and Comparative Examples was laminated with non-woven fabrics as the support materials by the lamination apparatus followed by the heat-setting apparatus as shown in FIG. 2, and the resulted laminate was tested as to the pressure loss (measurement temperature: room temperature). Lamination conditions were as follows:

Top side non-woven fabric: ELEVES T1003WD0 (product of UNITIKA, LDT.)

Bottom side non-woven fabric: ELEFIT E0303WDO (product of UNITIKA, LDT.)

Heating roll temperature (18 and 19): 150° C.

The above measurements was carried out as to 100 porous films, and an average pressure loss for each film was defined as the pressure losses of each porous film. In addition, a standard deviation of the pressure losses of the 100 films was divided by the average pressure loss followed by multiplying 100 to have the coefficient of variation, which was used as a measure of uniformity or variability over a surface of the film.

(Air Filter Unit Test)
Unit Pressure Loss

Ten filter units each having a unit size of 610 mm×610 mm×10 mm and a filtration area of 12 m² were manufactured from the laminate film prepared as described above and tested. The pressure loss was measured as a pressure difference using a manometer between the upstream and the downstream of the unit having an effective film area of 610 mm×610 mm when air flowed at a rate of 10 m³/min. through the unit.

Leak Point Number Measurement

The measurement the leak point number for the filter unit was carried out according to JACA No. 10C 4.5.4 ("Air Cleaning Apparatus Performance Test Standards" published by Japanese Air Cleaning Association in 1979).

A test fluid was prepared by mixing with DOP (dioctyl phthalate) particles formed by a Rankine nozzle and having a diameter not less than 0.3 $\mu$m into clean air to have a density of $10^9$-particles/ft³. Then, the test fluid is passed through an assembled air filter test unit from its upstream under such control that a fluid velocity is 0.4 m/sec.

Thereafter, a scanning probe was scanned at a speed of 5 cm/sec. at a 25 mm distance downstream of the unit while absorbing air in an amount of 5 to 30 liters/min. through the probe, and a DOP concentration of the downstream was estimated by using a particle counter.

The scanning was carried out over the whole of the filter medium surface and connections between the filter medium and frames, and each stroke of the scanning probe was slightly overlapped with a previous stroke.

When a leak point is present in the air filter unit, the DOP particle size distribution of the downstream is similar to that of the upstream so that the leak point can be identified.

The above test results are shown in Table 1 below:

TABLE 1

|  | Comparative Example | | Example | | | | | | | |
|---|---|---|---|---|---|---|---|---|---|---|
|  | 1 | 2 | 1 | 2 | 3 | 4 | 5 | 6 | 7 | 8 |
| [Properties prior to lamination] | | | | | | | | | | |
| Film thickness ($\mu$m) | 1 | 2 | 2 | 2 | 2 | 1.5 | 2 | 2.5 | 2.5 | 2.5 |
| Average pore diameter ($\mu$m) | 0.31 | 0.30 | 0.30 | 0.28 | 0.31 | 0.48 | 0.33 | 0.32 | 0.33 | 0.30 |
| Pressure loss (mmH$_2$O) | 22 | 43 | 41 | 44 | 40 | 15 | 30 | 40 | 39 | 44 |
| [Properties after lamination] | | | | | | | | | | |
| Pressure loss (mmH$_2$O) | 23 | 44 | 41 | 44 | 41 | 16 | 30 | 41 | 40 | 45 |
| Coefficient of variation (%) | 13.5 | 13.1 | 12.1 | 16.1 | 12.2 | 12.3 | 12.3 | 23.1 | 23.7 | 25.3 |
| [Filter unit properties] | | | | | | | | | | |
| Number of particle leak point (average) | 3 | 2.5 | 0 | 0 | 0 | 0 | 0 | 0 | 0 | 0 |
| Pressure loss across unit (mmH$_2$O) | 8 | 15 | 15 | 16 | 16 | 6 | 11 | 15 | 15 | 16 |

As clearly seen from Table 1, the PTFE porous film composite film according to the present invention has substantially no leak point.

Reference Example 1

As to a film composite in which of two longitudinally stretched films are overlapped, the following tests were carried out in order to confirm whether or not the stretch behaviors of each one film are independent of those of the other film(s) upon being stretched.

A flaw of a 5 mm long was formed in a predetermined portion of the semi-sintered longitudinally stretched film along its longitudinal direction using a blade which film was produced in Example 1. Another film with no flaw produced in Example 1 was overlapped on the film having the flaw and then the both films were stretched along their width directions by 30-fold and heat-set.

As a result, a round hole of which diameter was 1.5 cm was formed only in the film which had the flaw and no hole was formed in the film which had no flaw.

It is seen from the above result that each film behaves independently of the other film(s) when a film composite in which at least two longitudinally semi-sintered films are overlapped is stretched along its width direction to have the composite film.

Reference Example 2

Reference Example 1 was repeated to carry out the 30-fold width direction stretch and the heat-setting except that the temperature of the width direction stretching oven was 320°C. As in Reference Example 1, a round hole of which diameter was 1.5 cm was formed only in the film which had the flaw and no hole was formed in the film which had no flaw.

Reference Example 3

As in Reference Example 1, a flaw was formed in the unsintered longitudinally stretched film produced in Example 6, and another unsintered longitudinally stretched film produced in Example 6 without a flaw was overlapped on the former film to have a film composite. The composite was stretched by 30-fold along its width direction and then heat-set under the same condition as those of Example 1 except that the temperature of the width direction stretching oven was 380° C.

On checking the produced composite film, a round hole of which diameter was 1.5 cm was formed in each film.

It is seen from the above result that, on the stretch of the composite of unsintered tapes, two films do not behave independently so that a flaw in one film affects the other film when the composite is stretched along its width direction at a temperature not lower than the melting point of the PTFE.

We claim:

1. A process for the production of a polytetrafluoroethylene porous composite film comprising the steps of:
    obtaining a composite composed of at least two overlapping longitudinally stretched films each obtained by paste-extruding a polytetrafluoroethylene produced by emulsion polymerization to obtain a PTFE film, and stretching the obtained PTFE film along its longitudinal direction (its extrusion direction, MD (machine direction)) at a temperature not higher than the melting point of a sintered polytetrafluoroethylene material, and
    stretching said composite composed of at least two overlapping longitudinally stretched films together along its width direction (which is perpendicular to the longitudinal direction, TD (transverse direction)) under such conditions that the stretching behaviors of each film are independent of those of the other film(s).

2. The process for the production of a polytetrafluoroethylene porous composite film according to claim 1, wherein
    the step of stretching the formed composite along its width direction (which is perpendicular to the longitudinal direction, TD (transverse direction)) results in a stretched composite which is stretched by at least 50-fold of a stretch ratio based on a stretched area after the longitudinal direction stretch and the width direction stretch.

3. The process for the production of a polytetrafluoroethylene porous composite film according to claim 2, further comprising
    semi-sintering said PTFE film prior to stretching the PTFE film along its longitudinal direction.

4. A process for the production of a polytetrafluoroethylene porous composite film comprising the steps of:
    paste extruding a polytetrafluoroethylene to obtain a PTFE film;
    stretching said PTFE film along its extrusion direction (its longitudinal, MD (machine direction)) at a temperature not higher than the melting point of a sintered PTFE material to form a stretched PTFE film;
    overlapping at least two of said stretched PTFE films to form a composite;
    stretching said composite along its width direction (which is perpendicular to the longitudinal direction, TD (transverse direction)) under such conditions that the stretching behaviors of each stretched PTFE film are independent of those of the other film(s).

5. A process for the production of a polytetrafluoroethylene porous composite film comprising the steps of:
    stretching a polytetrafluoroethylene film along its extrusion direction (its longitudinal direction, MD (machine direction)) to form a stretched PTFE film;
    overlapping at least two of said stretched PTFE films to form a composite;
    stretching said composite along its width direction (which is perpendicular to the longitudinal direction, TD (transverse direction)) under such conditions that the stretching behaviors of each stretched PTFE film are independent of those of the other film(s).

6. A polytetrafluoroethylene porous composite film composed of overlapped at least two polytetrafluoroethylene films which have been stretched along a longitudinal direction and a width direction and which composite film has an average pore diameter of 0.2 to 0.5 $\mu$m, an average pressure loss of 10 to 100 mm-$H_2O$ for an air permeation velocity of 5.3 cm/sec at room temperature and substantially no leak point measured according to JACA.

7. A filter unit comprising a polytetrafluoroethylene porous composite film according to claim 6.

8. The process according to claim 1, wherein said polytetrafluoroethylene film which is obtained by paste-extrusion of a polytetrafluoroethylene obtained by emulsion polymerization is semi-sintered prior to stretching along its longitudinal direction.

9. The process according to claim 1, wherein said stretched composite is subjected to heat-setting.

10. The process according to claim 1, wherein the process further comprises the step of laminating a porous support material on at least one side of the porous composite film.

11. The process according to claim 2, wherein said stretched composite is subjected to heat-setting.

12. The process according to claim 2, wherein the process further comprises the step of laminating a porous support material on at least one side of the porous composite film.

13. The process according to claim 11, wherein the process further comprises the step of laminating a porous support material on at least one side of the porous composite film after heat-setting.

14. A polytetrafluoroethylene porous composite film produced by a process according to claim 2.

15. A filter unit comprising a polytetrafluoroethylene porous composite film according to claim 17.

16. The process according to claim 3, wherein said stretched composite is subjected to heat-setting.

17. The process according to claim 3, wherein the process further comprises the step of laminating a porous support material on at least one side of the porous composite film.

18. The process according to claim 16, wherein the process further comprises the step of laminating a porous support material on at least one side of the porous composite film after heat-setting.

19. A polytetrafluoroethylene porous composite film produced by a process according to claim 3.

20. A filter unit comprising a polytetrafluoroethylene porous composite film according to claim 19.

21. The process according to claim 12, wherein a temperature of the width direction stretch is in 100° to 200° C., and a temperature of the heat-setting in not lower than the temperature of the width direction stretch and not higher than the melting point of the sintered polytetrafluoroethylene material.

22. The process according to claim 17, wherein a temperature of the width direction stretch is not lower than the melting point of the sintered polytetrafluoroethylene material, and a temperature of the heat-setting is not lower than the melting point of the sintered polytetrafluoroethylene material.

23. The process according to claim 9, wherein the process further comprises the step of laminating a porous support material on at least one side of the porous composite film after the width direction stretch and the heat-setting.

24. A polytetrafluoroethylene porous composite film produced by a process according to claim 23.

25. A filter unit comprising a polytetrafluoroethylene composite film according to claim 24.

26. The process according to claim 25, wherein said stretched composite is subjected to heat-setting.

27. The process according to claim 25, wherein said PTFE film is semi-sintered prior to said step of longitudinally stretching.

28. The process according to any one of claims 25 and 27, wherein the process further comprises the step of laminating a porous support material on at least one side of the porous composite film.

29. The process according to claim 26, wherein the process further comprises the step of laminating a porous support material on at least one side of the porous composite film after heat-setting.

30. A polytetrafluoroethylene porous composite film produced by a process according to claim 25.

31. A filter unit comprising a polytetrafluoroethylene porous composite film according to claim 30.

32. The process for the production of a polytetrafluoroethylene porous composite film according to claim 1, wherein the step of stretching said composite composed of at least two overlapping longitudinally stretched films together along its width direction is conducted at a temperature not higher than the melting point of a sintered PTFE material.

33. The process for the production of a polytetrafluoroethylene porous composite film according to claim 4, wherein the step of stretching said composite along its width direction is conducted at a temperature not higher than the melting point of a sintered PTFE material.

34. The process for production of a polytetrafluoroethylene porous composite film according to claim 25, wherein the step of stretching said composite along its width direction is conducted at a temperature not higher than the melting point of a sintered PTFE material.

* * * * *